United States Patent
Ikeda et al.

(10) Patent No.: US 6,519,054 B1
(45) Date of Patent: Feb. 11, 2003

(54) IMAGE PROCESSING APPARATUS AND METHOD

(75) Inventors: Yuichi Ikeda, Numazu (JP); Nobuatsu Sasanuma, Mishima (JP); Tetsuya Atsumi, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/287,313

(22) Filed: Apr. 7, 1999

(30) Foreign Application Priority Data

Apr. 9, 1998 (JP) .......................................... 10-097732

(51) Int. Cl.$^7$ ............................. G06F 15/00; G06K 1/00
(52) U.S. Cl. ........................ 358/1.9; 358/1.2; 347/251; 347/252
(58) Field of Search ........................ 358/1.9, 1.2, 296, 358/298, 455, 459; 347/251, 252; 399/49

(56) References Cited

U.S. PATENT DOCUMENTS

| | | | |
|---|---|---|---|
| 5,319,433 A | 6/1994 | Fukushima et al. | 355/326 |
| 5,450,165 A | * 9/1995 | Henderson | 399/49 |
| 5,481,340 A | 1/1996 | Nagao et al. | 355/246 |
| 5,548,378 A | 8/1996 | Ogata et al. | 355/208 |
| 5,579,090 A | 11/1996 | Sasanuma et al. | 355/208 |
| 5,583,644 A | 12/1996 | Sasanuma et al. | 358/296 |
| 5,678,128 A | 10/1997 | Ikeda et al. | 399/49 |

* cited by examiner

Primary Examiner—Thomas D. Lee
(74) Attorney, Agent, or Firm—Fitzpatrick, Cella, Harper & Scinto

(57) ABSTRACT

When maximum density of an output image is lowered by a gamma correction, the number of tones is reduced and the tonality of the output image declines. In order to solve this problem, a pattern generator (215) is caused to generate a toned pattern and the gain of a D/A converter of a PWM circuit (212) is controlled so as to output a test pattern having a density ranging from maximum pulse width Pff (50%) to maximum pulse width Pff(100%) for each color component (step S1). Image information that has been read (step S2) from the test pattern is converted to density information (step S3), and Pff is set (step S4) from the relationship between Pff and image density based upon coordinate information provided by the test pattern.

16 Claims, 14 Drawing Sheets

IMAGE PROCESSING APPARATUS AND METHOD

BACKGROUND OF THE INVENTION

1. Field of the Invention

This invention relates to an image processing apparatus and method. More particularly, the invention relates to an image processing apparatus and method for forming a visible image on a recording medium based upon an image signal that has been pulse-width modulated.

2. Description of the Related Art

The following technique is available as a method of improving the stability of image quality by adjusting the image processing characteristics of an image forming apparatus such as a copier or printer:

The method includes starting up the image forming apparatus, forming a test pattern, which has a specific grayscale pattern, on a recording medium, reading the density of the formed test pattern using an image reading device, and revising a gamma correction table based upon the image information obtained, whereby image information obtained from the test pattern is fed back to the image forming conditions.

Though the maximum density of the image obtained by revising the gamma correction table can be reduced, the fact that the maximum density capable of being produced is fixed means that the maximum density of the formed image cannot be raised. Accordingly, if the maximum density of the image formed is set high and an adjustment is made so as to lower the maximum density by a gamma correction, the desired maximum density can be obtained. However, lowering the maximum density by a gamma correction means reducing the number of tones, thereby detracting from the tonality of the image.

There is also a technique in which maximum density is changed by changing contrast potential. However, in order to change the contrast potential, it is necessary to change the output voltage of a high-voltage power supply. This involves an increase in cost. Moreover, the method of changing contrast potential does not make it possible to regulate maximum density by image resolution (number of lines).

SUMMARY OF THE INVENTION

Accordingly, an object of the present invention is to provide an image processing apparatus and method through which maximum density can be controlled without reducing the number of tones.

According to a preferred embodiment of the present invention, the foregoing object is attained by providing an image processing apparatus comprising: forming means for forming a visible image on a recording medium based upon a pulse-width modulated image signal; generating means for generating a test pattern using the forming means; and setting means for setting image forming conditions, which include at least maximum pulse width of the image signal, based upon the test pattern generated.

Another object of the present invention is to provide an image processing apparatus and method through which maximum density can be controlled in dependence upon image resolution (recording density).

According to a preferred embodiment of the present invention, the foregoing object is attained by providing an image processing apparatus comprising: forming means for forming a visible image on a recording medium based upon a pulse-width modulated image signal; generating means for generating a test pattern using the forming means; and setting means for setting image forming conditions, which include at least maximum pulse width of the image signal, based upon the test pattern generated, wherein the maximum pulse width is set for each recording density of the image.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of an image processing apparatus according to the present invention will now be described in detail with reference to the drawings.

[Overview]

In order to solve the aforementioned problems encountered in the prior art, it is so arranged that a pulse width Pff, which corresponds to a maximum level FFh (a hexadecimal number) in case of an 8-bit image signal, can be varied over a prescribed range in pulse width modulation (PWM). Control is performed so as to enlarge the pulse width Pff when it is desired to raise the maximum density of an output image and reduce the pulse width Pff when it is desired to lower the maximum density. By adjusting the maximum density of the output image through such control, an output image having excellent tonality can be obtained without reducing the number of tones.

First Embodiment

[Construction]

The overall construction of the apparatus will be described with reference to FIGS. 1 and 2. In this embodiment, an electrophotographic digital copier will be described as one example of an apparatus to which the present invention can be applied.

Figure 1:
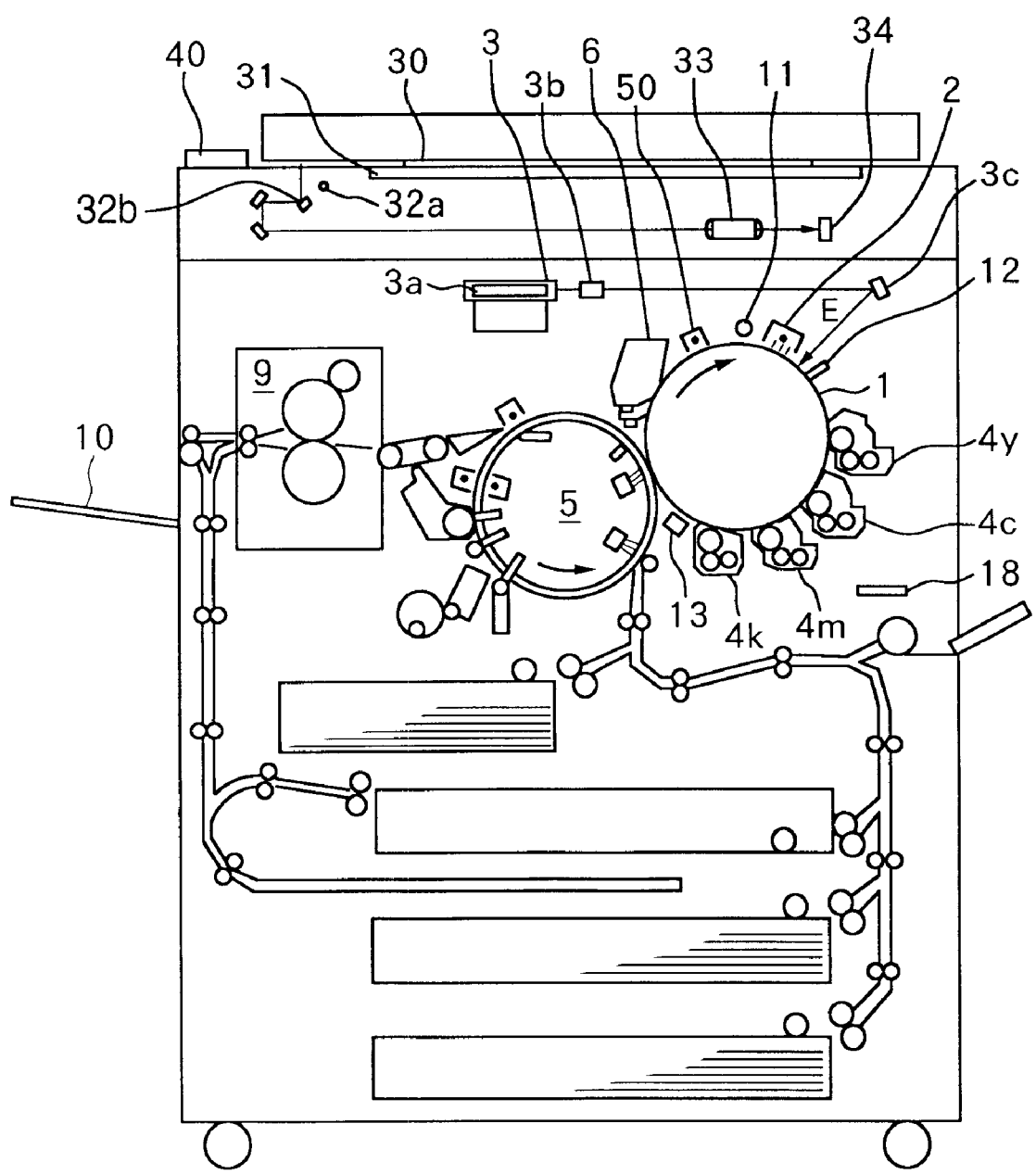
FIG. 1 is a general view of a digital copier according to an embodiment of the present invention.
Figure 2:
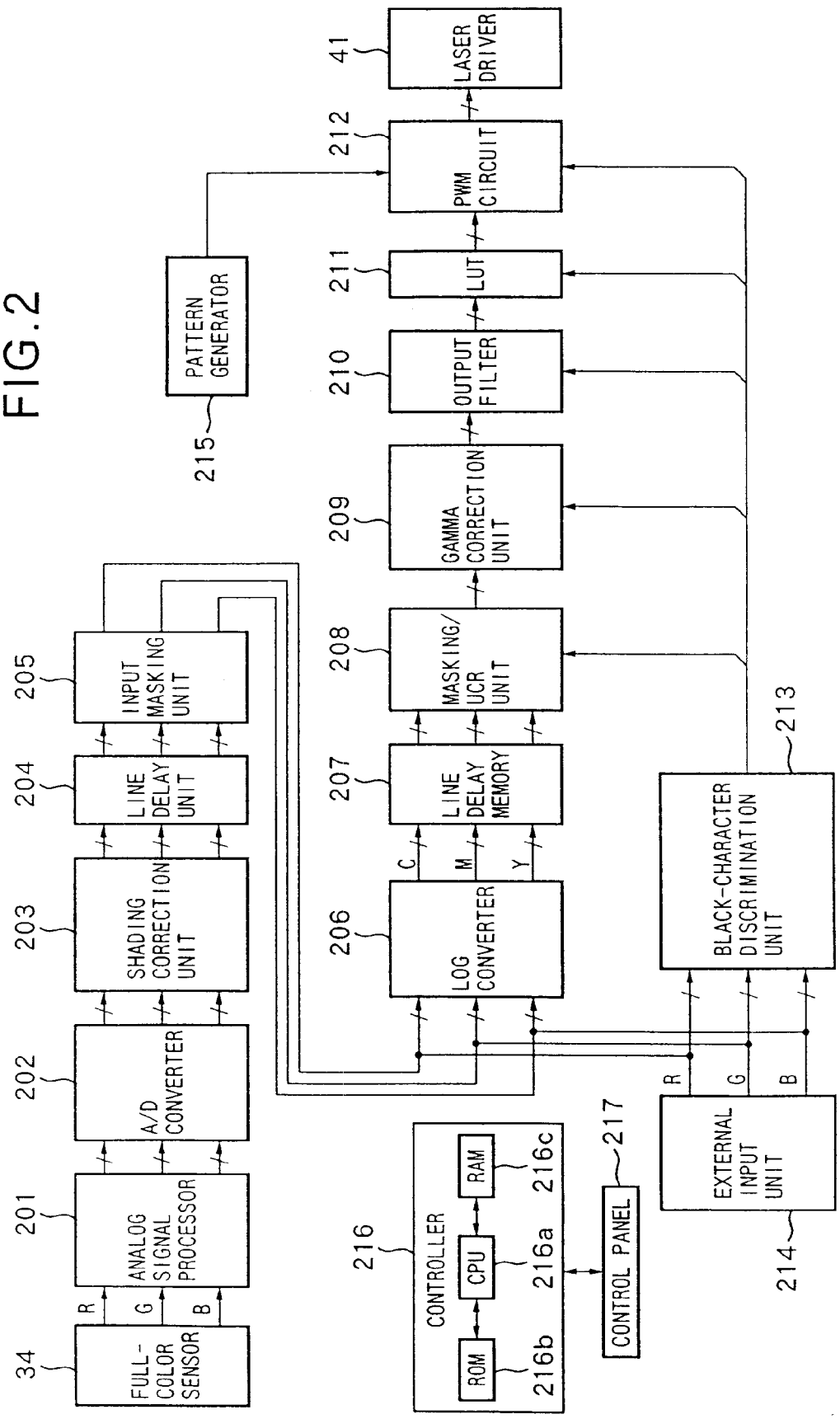
FIG. 2 is a block diagram showing the construction of an image processor in the digital copier.

FIG. 1 is a general view of a digital copier, and FIG. 2 is a block diagram showing the construction of an image processor in the digital copier.

A document 30 placed upon a glass platen 31 is illuminated by light from an exposure lamp 32a. Light reflected from the document 30 is guided by a plurality of mirrors 32b and a lens 33 and forms an image on a full-color sensor 34 comprising a 3-line charge-coupled device (CDD). The full-color sensor 34 outputs an analog RGB image signal representing the image of the document.

The RGB image signal output by the full-line sensor 34 is subjected to gain and offset adjustments by an analog signal processor 201 and is then converted to digital R, G, B image signals of, say, eight bits per color by an analog/digital (A/D) converter 202. The digital R, G, B singles are subjected to a shading correction by a shading correction unit 203, and a spatial shift ascribed to the three-line CCD is corrected by a line delay unit 204. The color space of the image signals is converted to standard color space, such as NTSC-RGB color space, by an input masking unit 205.

The R, G, B image signals output by the input masking unit 205, or R, G, B image signals that enter from an external personal computer via an external input unit 214, are sent to a LOG converter 206. It should be noted that the R, G, B image signals input to the external input unit 214 are the same as color image signals for displaying an image on a CRT monitor connected to a personal computer, by way of example.

The LOG converter 206, which is constituted by a look-up table (LUT) comprising a ROM or the like, subjects the input R, G, B signals to a luminance-to-density conversion and outputs C, M, Y image signals of, say, eight bits per color. A line delay memory 207 delays the input signals for a length of time required for black characters to be discriminated. The discrimination of black characters is executed by a black-character discriminator 213, which extracts black character images from the output of the input masking unit 205 and generates signals for controlling undercolor removal (UCR), filtering and resolution of pixels corresponding to the black character images. These control signals are sent to subsequent stages (described below) of the image processor to control the operation and processing of each of these stages. Images such as black characters and black line drawings are reproduced sharply by this black-character discrimination.

A masking/UCR unit 208 extracts a black component (K) from the input C, M, Y image signals and then subjects the C, M, Y, K image signals to a matrix operation in order to correct color dullness of the toner used as the recording material. It should be noted that the masking/UCR unit 208 outputs the M, C, Y, K image signals in the order mentioned, with one image signal being output per sub-scan of a scanner.

The image signal output by the masking/UCR unit 208 is subjected to a density correction, which conforms to the tone reproduction characteristic of the printer, by a gamma correction unit 209. The corrected signal is then subjecting to spatial filtering such as edge emphasis and smoothing by an output filter 210. This signal is in turn subjected to conversion processing, which is for obtaining conformity between the density characteristics of the original image and output image, by a LUT 211 constituted by a RAM. The resulting signal is then input to a PWM circuit 212, described in detail later, where the signal is converted to a pulse signal. The pulse signal is sent to a laser driver 41, where the light emission from a laser diode (LD) is controlled in accordance with the pulse signal.

Figure 3:
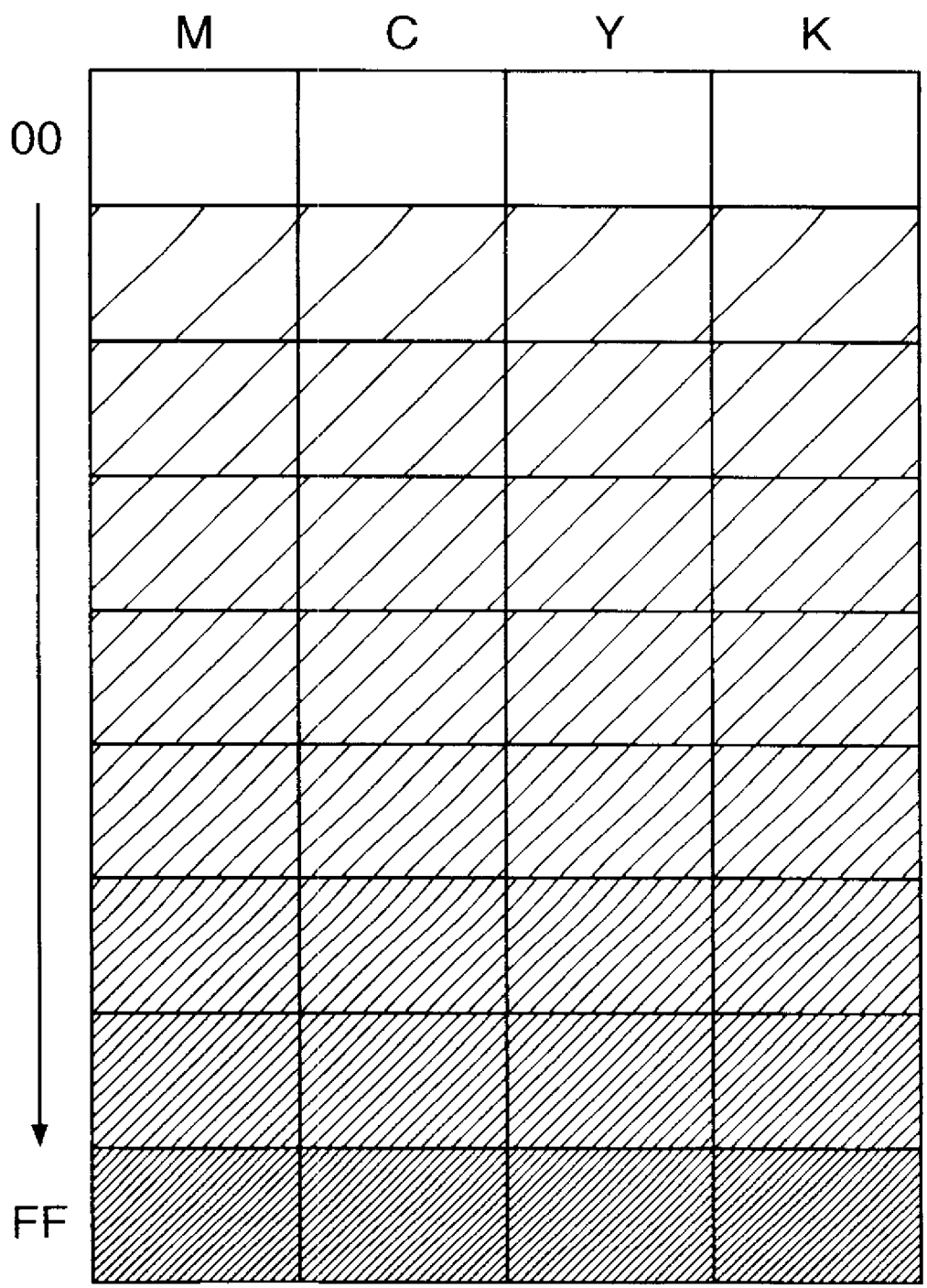
FIG. 3 is a diagram showing a toned pattern generated by a pattern generator shown in FIG. 2.

A toned pattern for each color component, as shown in FIG. 3, has been registered in a pattern generator 215. The pattern signal generated by the pattern generator 215 is input directly to the PWM circuit 212.

A laser beam E output by the laser diode is caused to sweep by a rotating polygonal mirror 3a of a polygon scanner 3 so that a photosensitive drum 1, which is rotating in the direction of the arrow in FIG. 1, is scanned by the laser beam via an f-θ lens 3b and a mirror 3c, thereby forming an electrostatic latent image on the photosensitive drum 1. A pre-exposure lamp 11, a primary corona discharge unit 2, a surface-potential sensor 12, developing units 4y, 4c, 4m and 4k for respective ones of the four colors, a light-quantity sensor 13, a transfer unit 5 and a cleaner 6 are disposed about the photosensitive drum 1.

The electrostatic latent image that has been formed on the photosensitive drum 1 is developed by the toners of the developing units, after which the image is transferred to printing paper that has been wound upon the transfer unit 5. The printing paper, to which the toners of the four colors M, C, Y, K have been transferred in superimposed form, is sent to a fixing unit 9. After the toners are fixed, the sheet of printing paper is ejected into a tray 10.

The toners are obtained by using a styrene copolymer resin as a binder and dispersing colorants of the respective colors in the binder.

[Tone Reproduction Characteristic]

Figure 4:
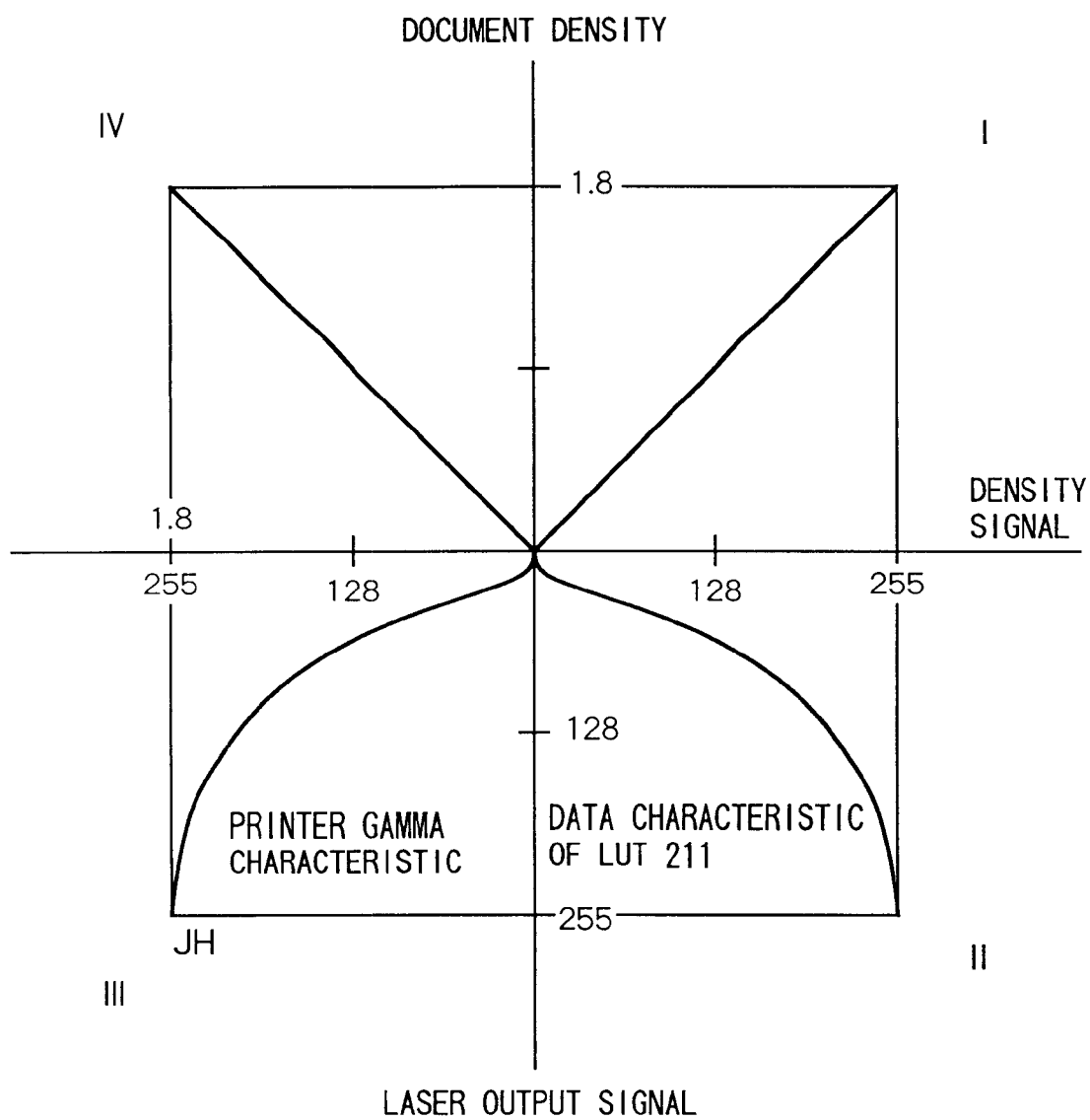
FIG. 4 is a quadrant chart showing an example of a tone reproduction characteristic.

FIG. 4 is a quadrant chart showing an example of a tone reproduction characteristic.

The first quadrant indicates the characteristic of a reader, which converts the image density of a document to a density signal, the second quadrant the conversion characteristic of the LUT 211, which matches the density characteristic of the original image with that of the output image, the third quadrant the characteristic of a printer, which converts the laser output to image density, and a fourth quadrant the relationship between the document density and the output density, i.e., the overall grayscale characteristic of the image forming apparatus. The number of tones will be 256 if an 8-bit digital signal is processed. It will be understood from the chart of FIG. 4 that a grayscale characteristic having the excellent linearity shown in the fourth quadrant is obtained by using the characteristic of LUT 211 indicated in the second quadrant to correct the non-linear printer characteristic shown in the third quadrant.

The image signal whose grayscale characteristic has been corrected by the LUT 211 is converted by the PWM circuit 212 to a pulse signal having a pulse width corresponding to dot width. The pulse-width modulated signal is sent to the laser driver 41. A latent image, the tones whereof are expressed by the areas of dots, is formed on the photosensitive drum 1 by scanning of the laser beam, and a grayscale image is obtained through the above-mentioned processes of development, transfer and fixation.

[Pulse-width Modulation Circuit]

Figure 5:
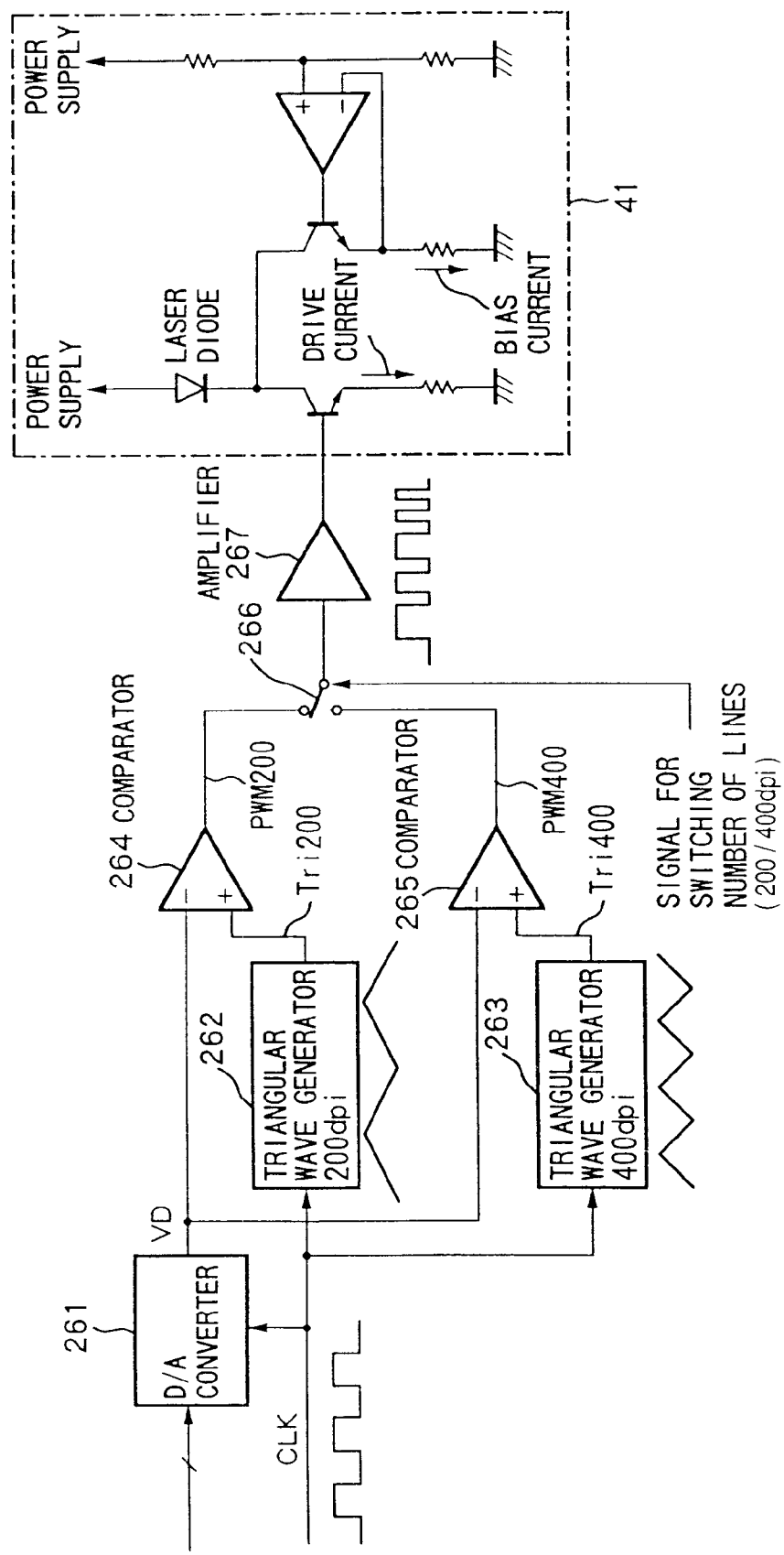
FIG. 5 is a block diagram showing the construction of a PWM circuit illustrated in FIG. 2.
Figure 6:
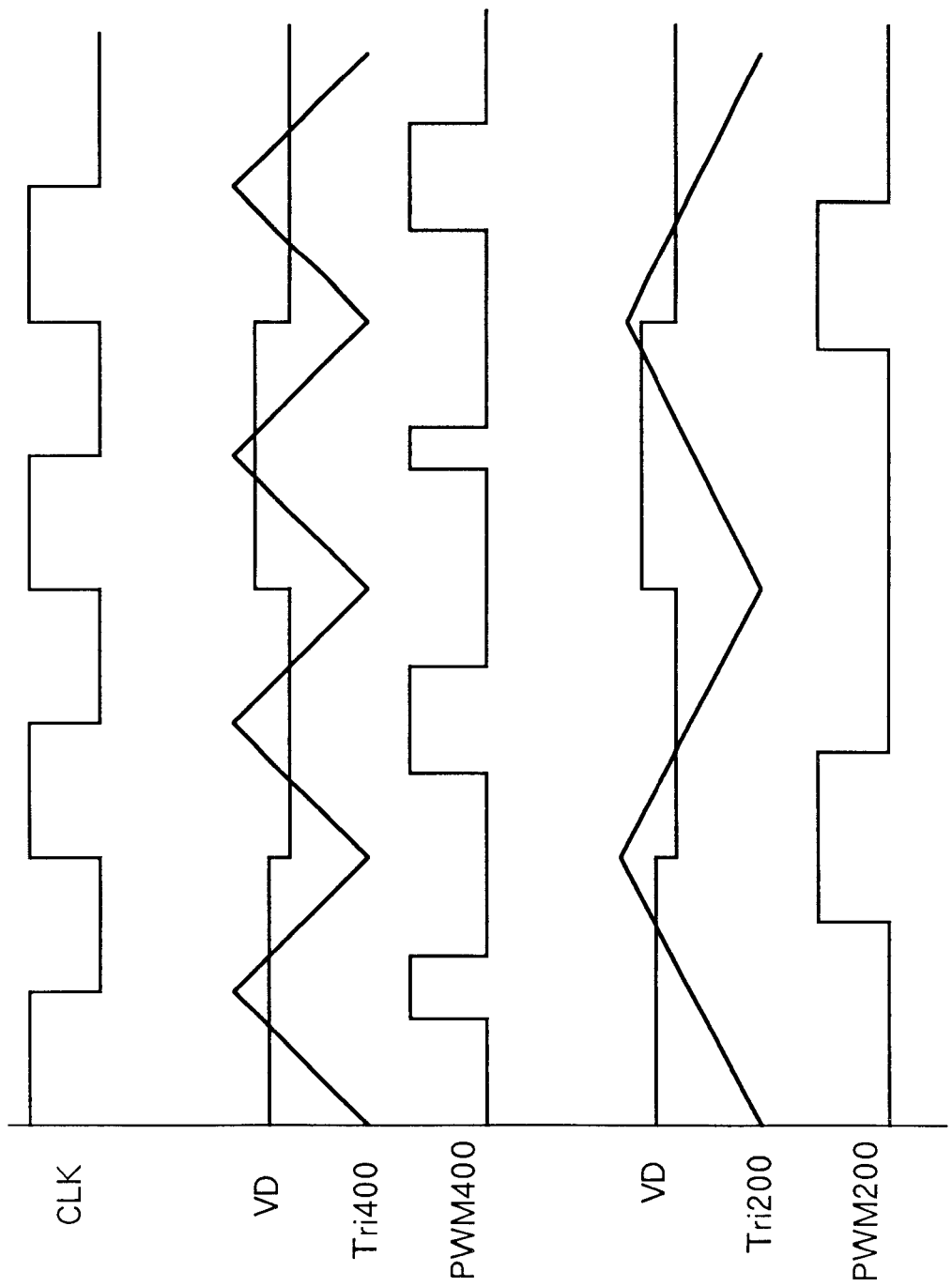
FIG. 6 shows the principal signal waveforms associated with the PWM circuit.

FIG. 5 is a block diagram showing the construction of the PWM circuit 212, and FIG. 6 is a diagram showing the principal signal waveforms associated with the PWM circuit 212.

A digital image signal that enters in sync with an image clock CLK is converted to an analog image signal VD by a D/A converter 261. A comparator 264 compares the analog image signal VD with a triangular wave Tri200, which has a resolution of 200 dpi, generated by a triangular-wave generator 262 in sync with the clock CLK. A comparator 265 compares the analog image signal VD with a triangular wave Tri400, which has a resolution of 400 dpi, generated by a triangular-wave generator 263 in sync with the clock CLK. The comparators 264, 265 produce output signals PWM200, PWM400, respectively. The comparator output signal PWM200 or PWM400 is input to an amplifier 267 via a switch 266 controlled by a line-number switching signal. The signal is amplified by the amplifier 267 and then sent to the laser driver 41.

Figure 7:
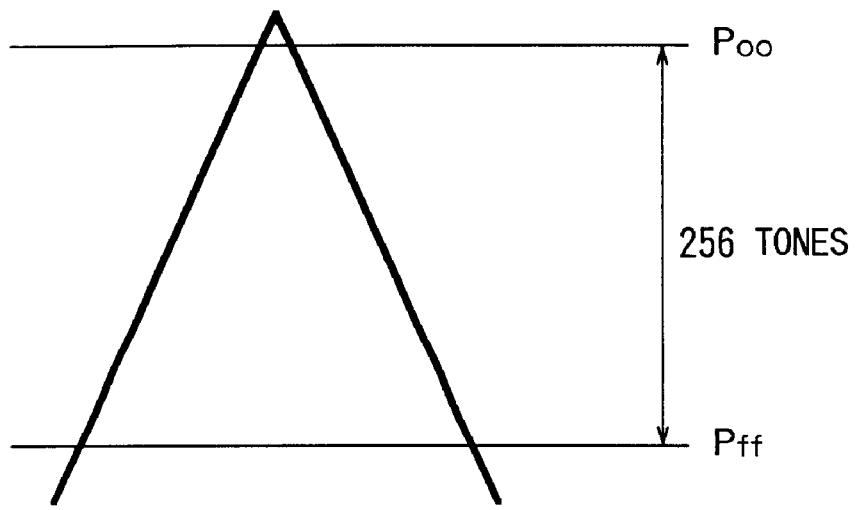
FIG. 7 is a diagram showing the relationship between the level and pulse width of an image signal.
Figure 8:
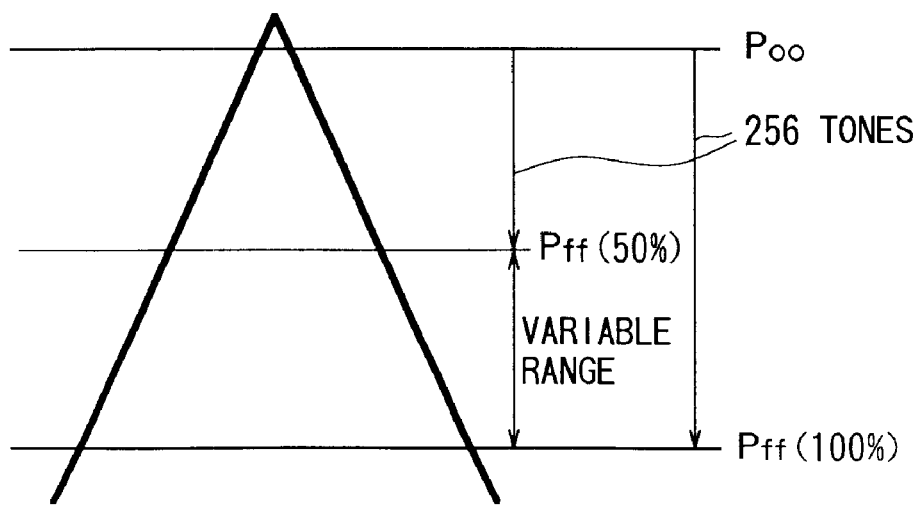
FIG. 8 is a diagram showing the relationship between the level and pulse width of an image signal.

As shown in FIG. 7, the pulse signal obtained by pulse-width modulation usually has 256 levels from a pulse width P00 corresponding to a digital signal of 0 to a pulse width Pff corresponding to a digital image signal of FFh. The PWM circuit 212 according to this embodiment is capable of varying the pulse width Pff corresponding to the digital image signal of FFh by adjusting the gain of the D/A converter 261. In other words, according to this embodiment, the pulse width Pff in regard to Pff can be varied within a range of from Pff(50%) to Pff(100%), as shown in FIG. 8.

[Contrast Potential]

Figure 9:
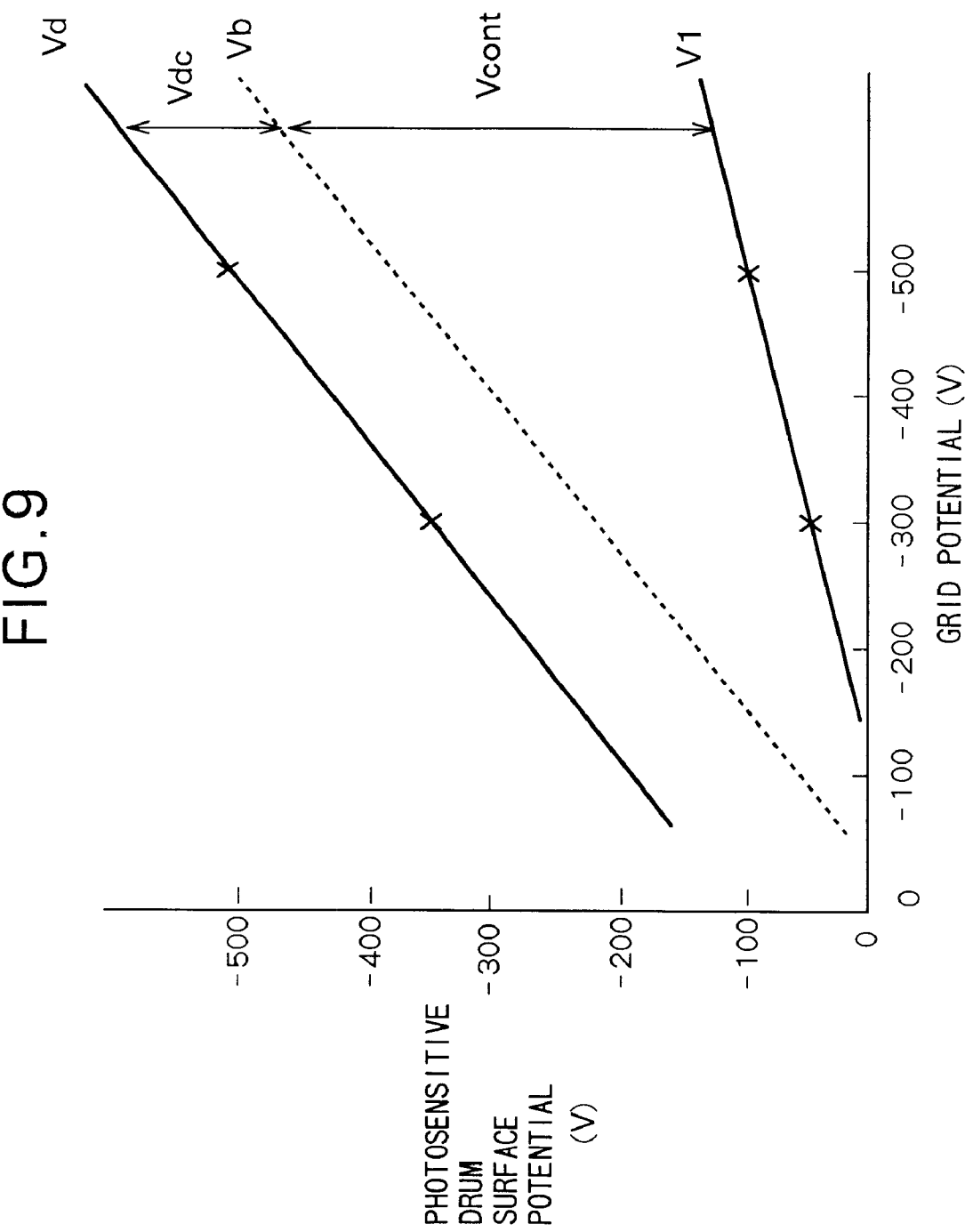
FIG. 9 is a diagram useful in describing contrast potential.

FIG. 9 is a diagram for describing contrast potential. Here the horizontal axis is a plot of the voltage (grid potential) of the primary corona discharge unit 2, and the vertical axis is a plot of the surface potential of the photosensitive drum 1. Further, V1 represents the drum surface potential after it has been scanned by a laser beam corresponding to the image signal of FFh, and Vdc represents development bias. The potential difference from Vb, which is obtained by subtracting Vdc from Vd, to V1 is contrast voltage Vcont. A larger contrast potential Vcont makes it easier for toner to attach itself to the photosensitive drum 1, thereby producing a higher density.

Figure 10:
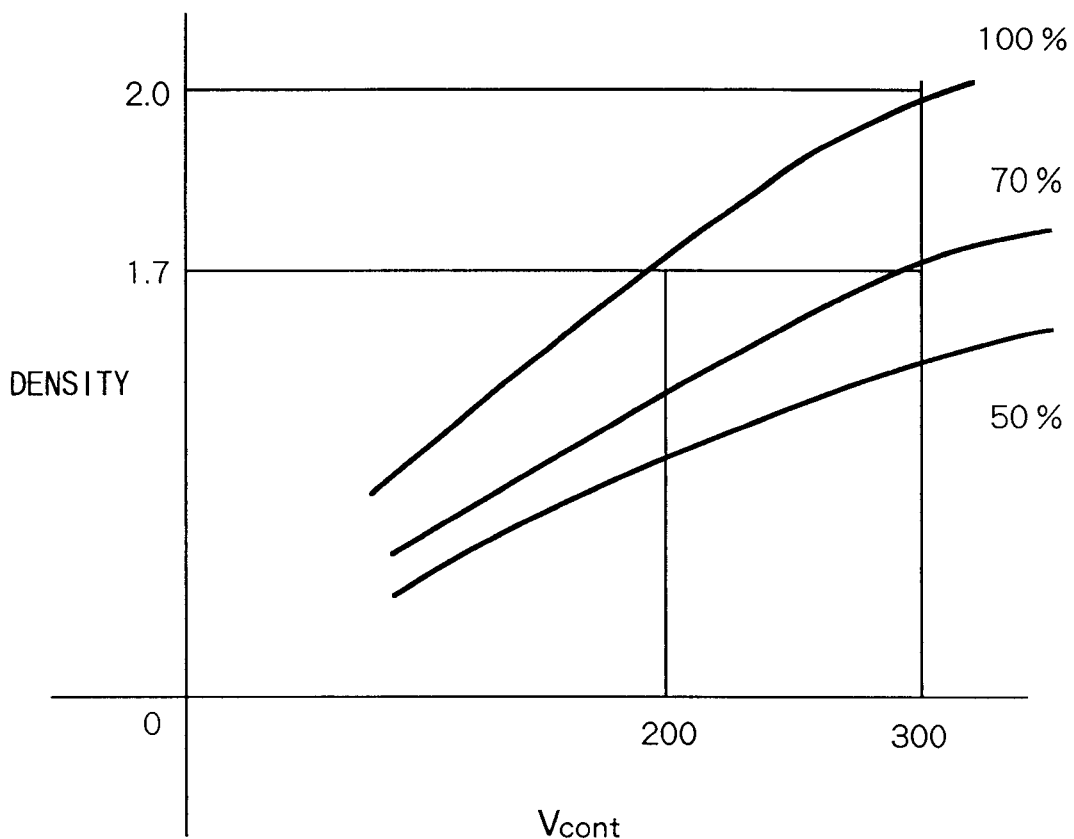
FIG. 10 is a diagram showing the relationship between contrast potential Vcont and maximum density, in which maximum pulse width Pff serves as a parameter.

FIG. 10 is a diagram showing the relationship between the contrast potential Vcont and maximum density, in which maximum pulse width Pff serves as a parameter. It will be understood from FIG. 10 that controlling the maximum pulse width Pff makes it possible to vary maximum density even if Vcont is the same.

[Maximum Density Adjustment]

Figure 11:
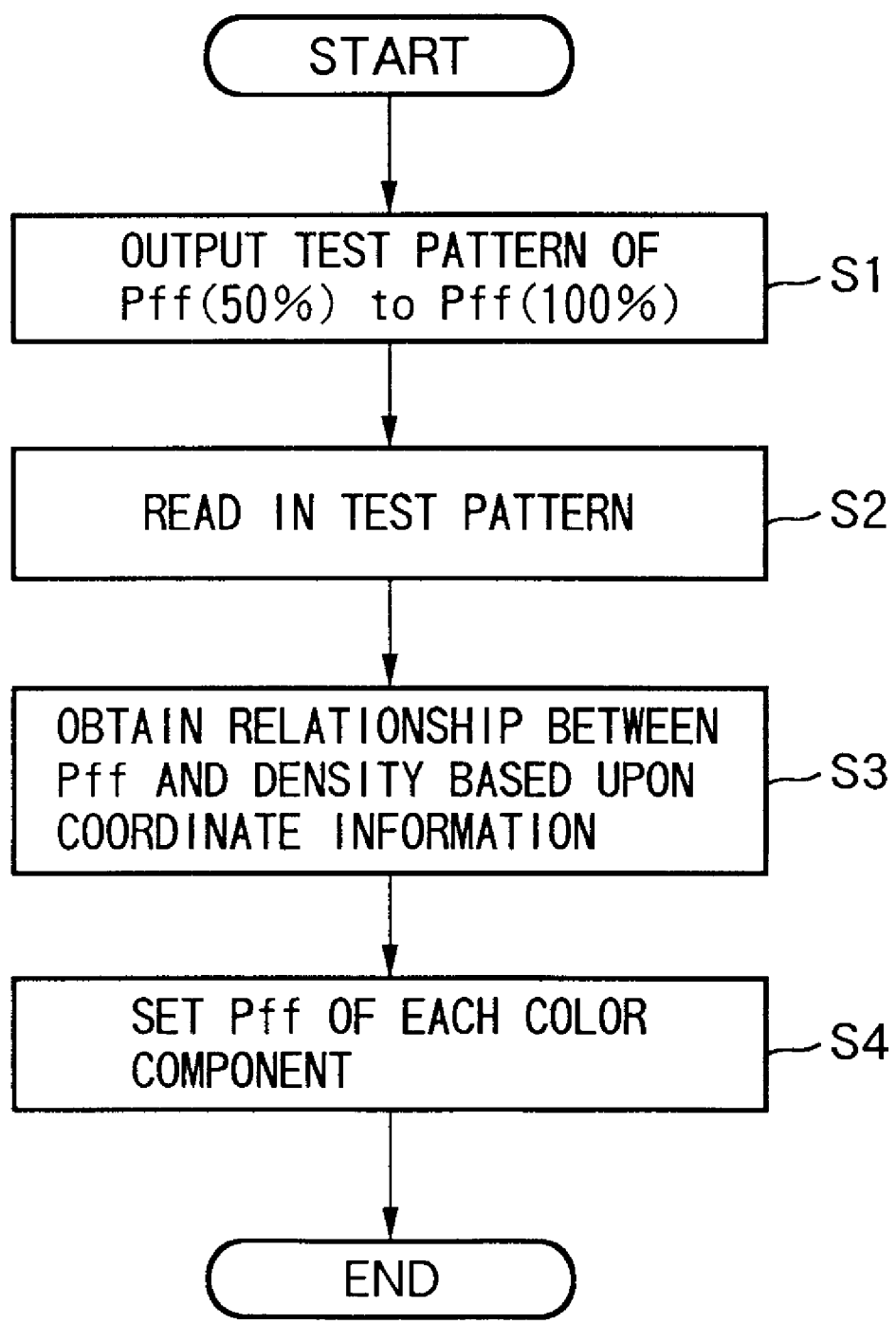
FIG. 11 is a flowchart showing a procedure for adjusting maximum density.

FIG. 11 is a flowchart showing a procedure for adjusting maximum density according to this embodiment. This processing is executed by a controller 216 comprising CPU 216a, ROM 216b and RAM 216c in a case where the start of maximum density adjustment is instructed via a control panel 217 by an operator who has determined that the maximum density of the image output is abnormal.

Figure 12:
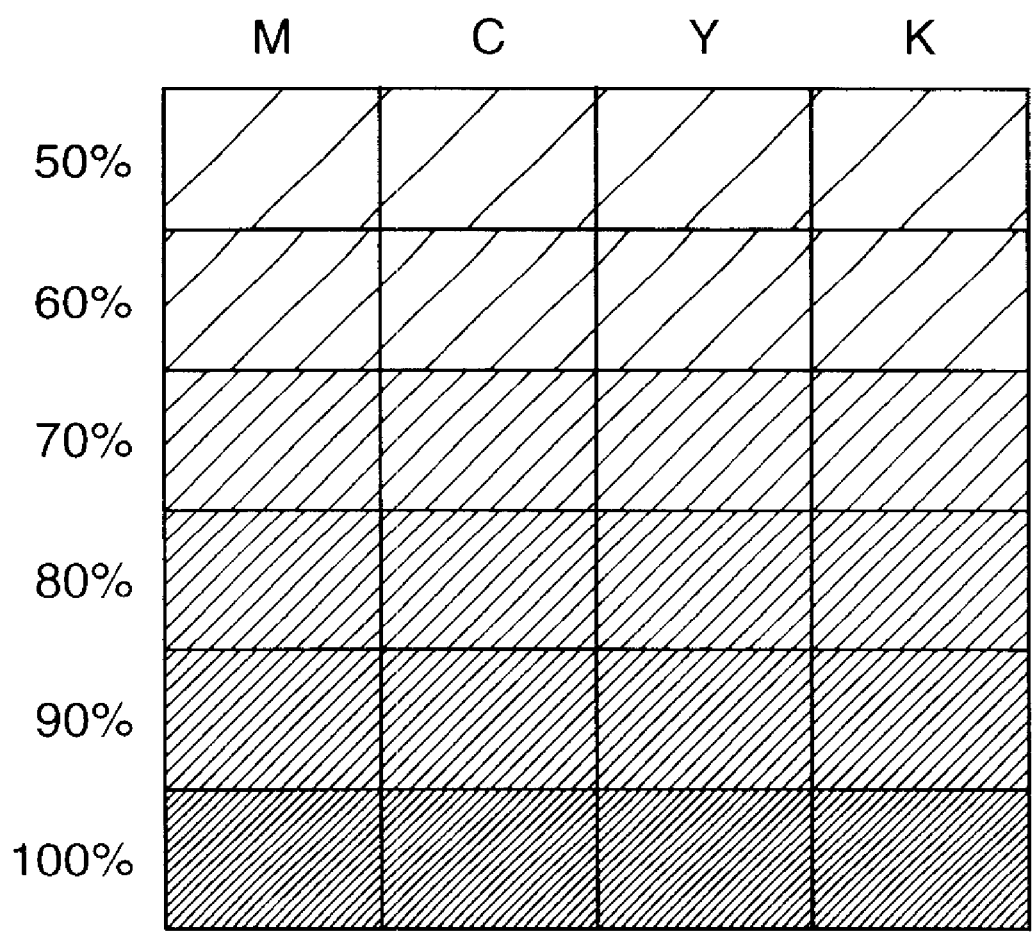
FIG. 12 is a diagram showing a test pattern for adjusting maximum pulse width Pff.
Figure 13:
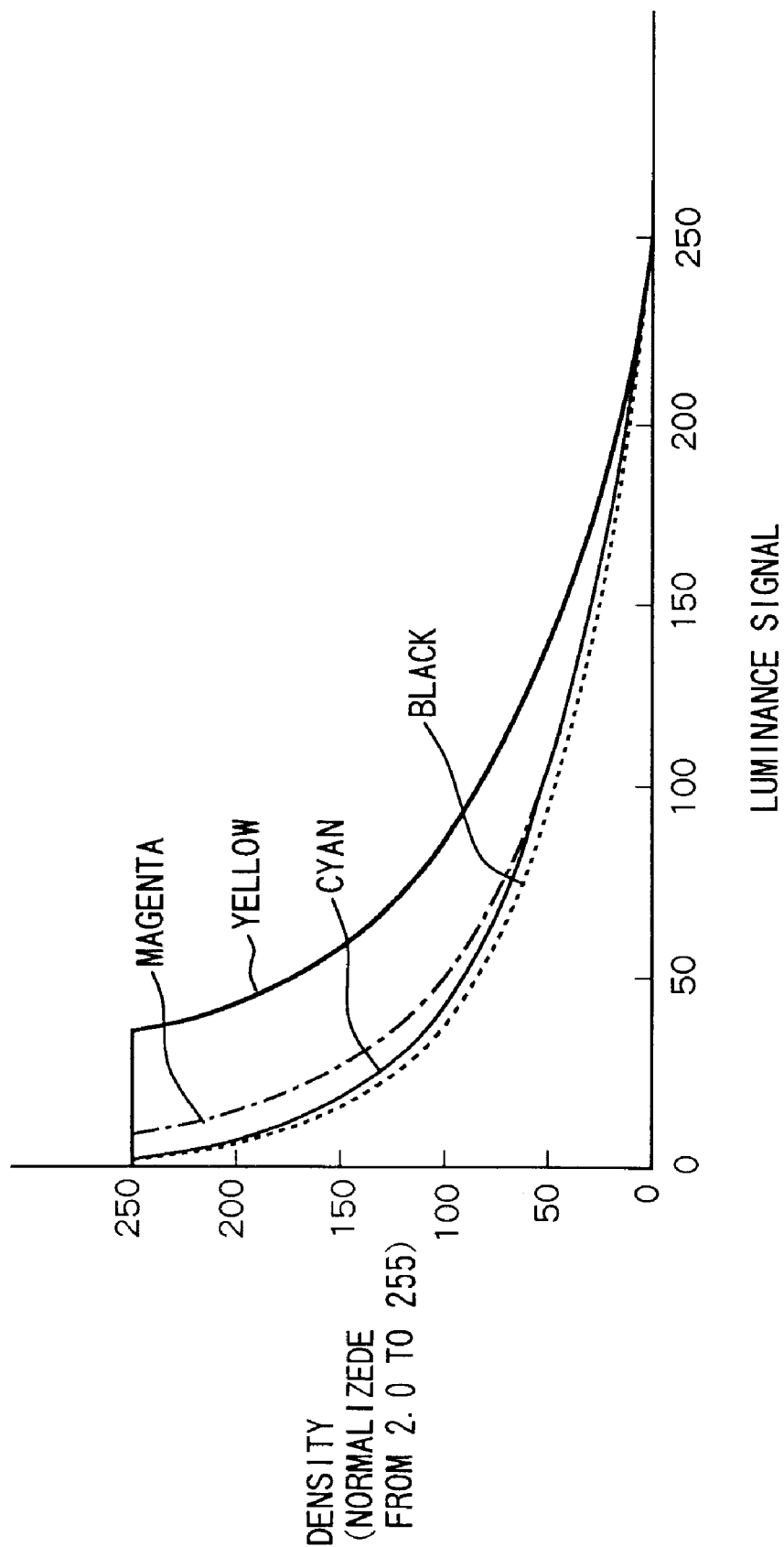
FIG. 13 is a diagram showing an example of a luminance-density conversion characteristic.

The controller 216 causes the pattern generator 215 to generate the toned pattern and controls the gain of the D/A converter 261 of PWM circuit 212 so that a test pattern of the kind shown in FIG. 12 is output (step S1). The test pattern shown in FIG. 12 has a density that ranges from Pff(50%) to Pff(100%) for each color component. A printout of this test pattern is placed on the glass platen 31 of the reader by the operator and the pattern is read in response to instructions from the operator (step S2). It is known that an optical system using a CCD will generally provide good measurement reproducibility if a shading correction is carried out. The luminance information of the test pattern obtained is converted to density information using a table having a conversion characteristic illustrated in FIG. 13 (step S3). The relationship between pulse width Pff and density is found on the basis of the coordinate information of this density information.

Figure 14:
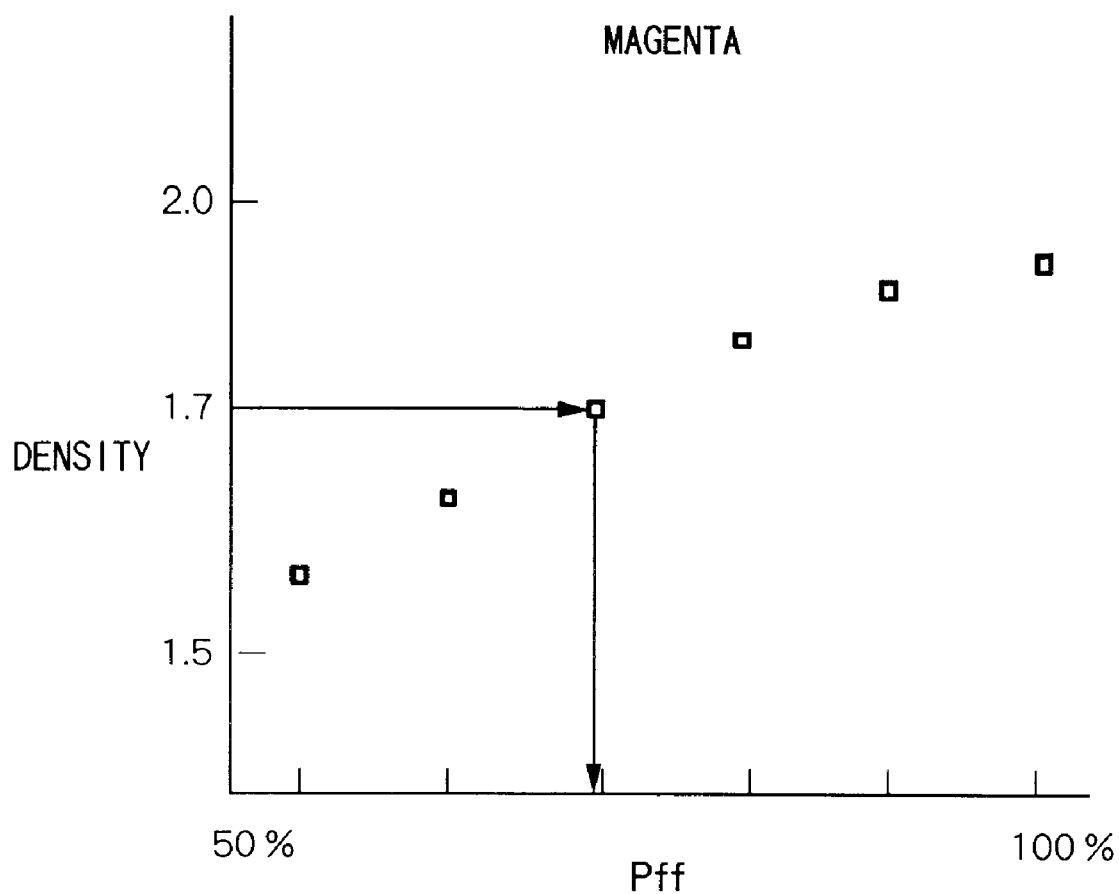
FIG. 14 is a diagram showing an example of the relationship between the maximum pulse width Pff and density for the color magenta.

FIG. 14 shows an example of the relationship between the pulse width Pff and density of magenta thus obtained. A pulse width Pff that will give a reference value of 1.7 for the maximum density of each color component is found based upon this data. For example, it will be understood that a density of 1.7 is obtained for magenta at Pff(70%), for cyan at Pff(60%), for yellow at Pff(50%) and for black at Pff (80%). This value is retained in a non-volatile memory such as the RAM 216c so that it may be utilized in subsequent image formation (step S4). In a case where Pff for which the reference value of 1.7 is obtained falls between the measurement points marked off at intervals of 10%, Pff is found by performing interpolation between the two points.

By forming an image based upon the Pff of each color component thus found, maximum density can be controlled to an optimum value without reducing the number of tones and without changing the contrast potential. Although Pff is varied at intervals of 10% in the above-described example, it goes without saying that Pff may be varied over small step widths, e.g., at intervals of 5%.

Second Embodiment

In the first embodiment, an example in which maximum density is controlled by changing the set value of Pff is described. However, since the grayscale characteristic of the printer at Pff(60%) is different from that at Pff(100%), for example, it is desired that the conversion characteristic of the LUT 211 also be changed. Accordingly, in the second embodiment, a more suitable tonality is obtained by controlling the conversion characteristic of the LUT 211 after Pff is set.

Figure 15:
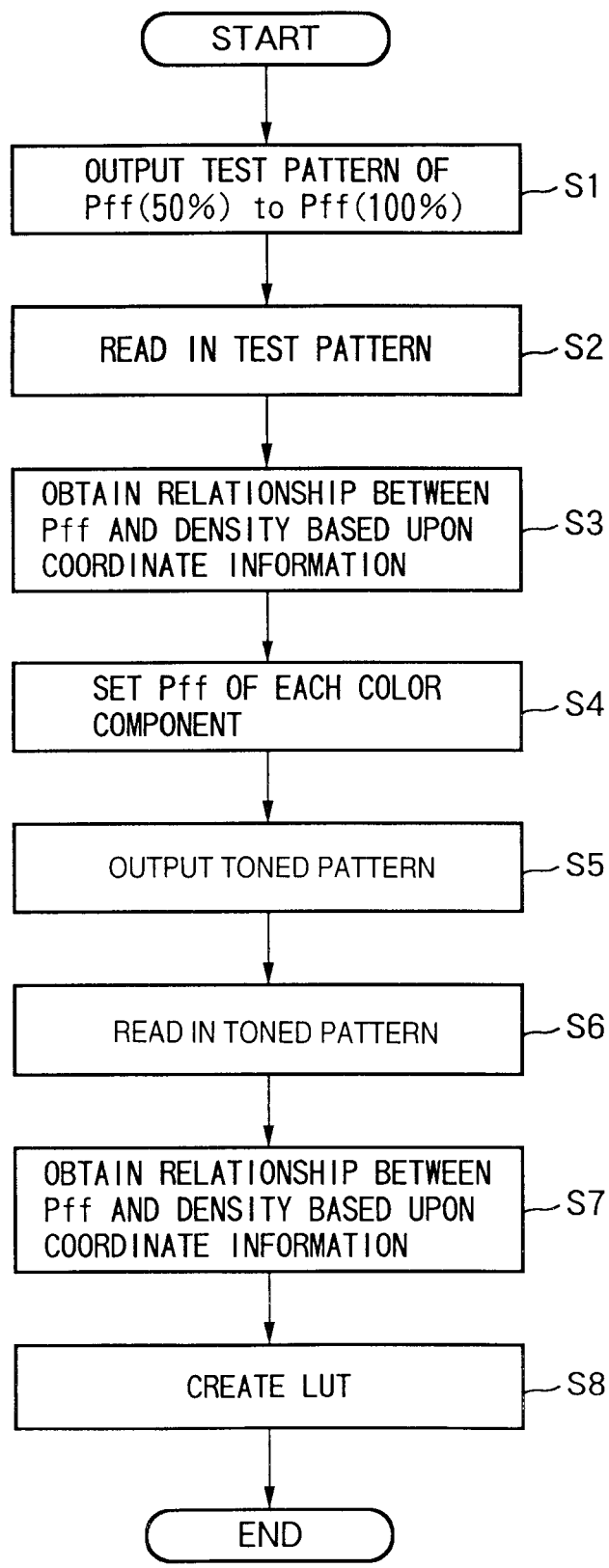
FIG. 15 is a flowchart showing a procedure for adjusting maximum density in a second embodiment of the present invention.

FIG. 15 is a flowchart showing a procedure for adjusting maximum density according to the second embodiment. This processing is executed by the controller 216 in a case where the start of maximum density adjustment is instructed via the control panel 217 by an operator who has determined that the maximum density of the image output is abnormal.

Steps S1 to S4 are the same as those in FIG. 11 and need not be described again. After these steps are executed, the controller 216 causes the pattern generator 215 to generate the toned pattern shown in FIG. 3 and controls the gain of the D/A converter 261 of PWM circuit 212 based upon the set Pff so that the toned pattern is output (step S5). The toned pattern shown in FIG. 3 has a density pattern in which the signal value is varied from 0 to FFh for each color component. A printout of this toned pattern is placed on the glass platen 31 of the reader by the operator and the toned pattern is read in response to instructions from the operator (step S6). The luminance information of the toned pattern obtained is converted to density information using the table having the conversion characteristic illustrated in FIG. 13 (step S7). The conversion curve of the LUT 211 is created based upon the coordinate information of this density information (step S8).

By thus first setting the Pff of each color component and then creating the conversion curve of the LUT 211 based upon the set Pff, a change in the grayscale characteristic of the output image due to a change in Pff is prevented and an output image having a better grayscale characteristic can be obtained.

Third Embodiment

In an image forming apparatus having a plurality of resolutions (recording densities), the optimum value of Pff differs for each resolution. In the third embodiment, therefore, Pff is varied in dependence upon resolution to obtain an image having a better grayscale characteristic.

A photographic image is formed at a low resolution (e.g., 200 lines) where highlight portions have good reproducibility, while characters and line images are formed at a high resolution (e.g., 400 lines) so that fine portions are reproduced more sharply. According to this embodiment, therefore, photographic areas are formed at the maximum density of 1.5 to achieve faithful reproduction, and characters or line drawings are formed at a maximum density of 2.0 to achieve sharp reproduction.

If image density is raised by means of the contrast voltage Vcont, switching made to conform to resolution (e.g., switching between 200 and 400 lines) is difficult to perform. In accordance with this embodiment, Pff is switched in dependence upon whether an area is a photographic area or a character/line-drawing area, thereby making it possible to reproduce characters and line drawings more darkly and sharply and to faithfully reproduce the tonality of photographic image areas.

Thus, in accordance with the present invention, as described above, it is possible to provide an image processing apparatus and method for controlling maximum density without reducing the number of tones.

Further, it is possible to provide an image processing apparatus and method for controlling maximum density in dependence upon image resolution.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   an image forming unit for forming a visible image on a recording medium based upon a pulse-width modulated image signal;
   a generator for generating a test pattern from a plurality of pulse-width modulated signals using said image forming unit, wherein a pulse width of each of the plurality of signals is predetermined and is different from pulse widths of others of the plurality of signals; and
   a setting unit for setting image forming conditions, which include at least a maximum pulse width of the image signal, based upon the test pattern generated.

2. The image processing apparatus according to claim 1, further comprising:
   a correction unit for correcting an image signal input thereto; and
   a modulator for pulse-width modulating the image signal, which has been corrected by said correction unit, and supplying the pulse-width modulated signal to said image forming unit.

3. The image processing apparatus according to claim 2, wherein said setting unit sets a correction characteristic of said correction unit.

4. The image processing apparatus according to claim 3, wherein after setting the maximum pulse width, said setting unit sets the correction characteristic based upon the test pattern generated by said generator.

5. The image processing apparatus according to claim 4, wherein the correction characteristic is a characteristic for matching a density characteristic of an original image with the density characteristic of a formed image.

6. The image processing apparatus according to claim 1, wherein the maximum pulse width is set for each color component of the image signal.

7. The image processing apparatus according to claim 1, wherein the maximum pulse width is set for each recording density of the image.

8. The image processing apparatus according to claim 1, wherein the maximum pulse width is set in such a manner that a prescribed image density is obtained when an image signal having the maximum pulse width is supplied to said image forming unit.

9. The image processing apparatus according to claim 1, wherein said setting unit has a reader for reading density information from the test pattern generated.

10. An image processing method of an image processing apparatus having an image forming unit for forming a visible image on a recording medium based upon a pulse-width modulated image signal, said image processing method comprising the steps of:
    generating a test pattern from a plurality of pulse-width modulated signals using the image forming unit, wherein a pulse width of each of the plurality of signals is predetermined and is different from pulse widths of others of the plurality of signals; and
    setting image forming conditions, which include at least a maximum pulse width of the image signal, based upon the test pattern generated.

11. The image processing method according to claim 10, wherein the image forming conditions include a conversion characteristic for matching a density characteristic of an original image with the density characteristic of a formed image.

12. The image processing method according to claim 10, wherein the maximum pulse width is set for each color component of the image signal.

13. The image processing method according to claim 10, wherein the maximum pulse width is set for each recording density of the image.

14. The image processing method according to claim 10, wherein the maximum pulse width is set in such a manner that a prescribed image density is obtained when an image signal having the maximum pulse width is supplied to the image forming unit.

15. The image processing method according to claim 10, wherein density information is read from the generated test pattern in said setting step.

16. A computer program product comprising a computer-readable medium storing computer program code for executing image processing of an image processing apparatus having an image forming unit which forms a visible image on a recording medium based upon a pulse-width modulated image signal, said product comprising process procedure codes for:

generating a test pattern from a plurality of pulse-width modulated signals using the image forming unit, wherein a pulse width of each of the plurality of signals is predetermined and is different from pulse widths of others of the plurality of signals; and setting image forming conditions, which include at least a maximum pulse width of the image signal, based upon the test pattern generated.

* * * * *